US009592522B2

(12) United States Patent
Schaefer

(10) Patent No.: US 9,592,522 B2
(45) Date of Patent: *Mar. 14, 2017

(54) MULTILEVEL PAINT SHOP FOR PAINTING OBJECTS

(75) Inventor: Wolf-Hasso Schaefer, Tiefenbronn (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 270 days.

This patent is subject to a terminal disclaimer.

(21) Appl. No.: 13/015,727

(22) Filed: Jan. 28, 2011

(65) Prior Publication Data

US 2011/0162576 A1 Jul. 7, 2011

Related U.S. Application Data

(63) Continuation of application No. PCT/EP2009/059104, filed on Jul. 15, 2009.

(30) Foreign Application Priority Data

Jul. 29, 2008 (DE) ........................ 10 2008 036 321

(51) Int. Cl.
*B05C 13/02* (2006.01)
*B05B 15/12* (2006.01)
(Continued)

(52) U.S. Cl.
CPC .......... *B05B 15/1292* (2013.01); *B05B 13/02* (2013.01); *B05B 15/1207* (2013.01);
(Continued)

(58) Field of Classification Search
CPC ............ B05B 13/0207; B05B 13/0214; B05B 13/0221; B05B 13/0271; B05B 13/0285;
(Continued)

(56) References Cited

U.S. PATENT DOCUMENTS 3,014,602 A * 12/1961 Gronvold .................. E04H 6/14 198/798
3,033,390 A * 5/1962 Gronvold .................. E04H 6/14 198/797
(Continued)

FOREIGN PATENT DOCUMENTS

DE 196 30 290 A1 1/1998
DE 102 32 402 A1 2/2004
(Continued)

OTHER PUBLICATIONS

International Search Report in International Application No. PCT/EP2009/059104 mailed Nov. 25, 2009.
(Continued)

*Primary Examiner* — Karl Kurple
(74) *Attorney, Agent, or Firm* — Leydig, Voit & Mayer, Ltd.

(57) ABSTRACT

To provide a paint shop for painting objects to be painted in the form of vehicle bodies and/or parts of vehicle bodies, there is proposed a paint shop for painting objects to be painted in the form of vehicle bodies and/or parts of vehicle bodies which comprises the following: a building shell, which encloses a building interior, in which are arranged at least one dip tank and at least one open treatment area, which is open in relation to the building interior; a first transport level, on which objects to be painted can be transported through at least one open treatment area; a second transport level, from which objects to be painted can be dipped into at least one dip tank; and at least one intermediate storage unit, wherein at least one object to be painted can be transported from one transport level of the paint shop into the intermediate storage unit and later can be transported out of the intermediate storage unit into another transport level of the paint shop.

15 Claims, 9 Drawing Sheets

(51) Int. Cl.
*B05B 13/02* (2006.01)
*B05C 3/10* (2006.01)

(52) U.S. Cl.
CPC ...... *B05B 15/1214* (2013.01); *B05B 15/1288* (2013.01); *B05C 3/10* (2013.01); *B05B 15/1266* (2013.01); *B05C 13/02* (2013.01)

(58) Field of Classification Search
CPC ............ B05B 13/0436; B05B 15/1288; B05B 13/0452; B62D 65/18; C25D 3/00; C25D 17/06; F26B 2210/12; B65G 2201/0294; B65D 2585/6867; B65D 2585/6882
USPC ................ 118/58, 66, 75, 304, 429; 29/822; 198/465.1; 427/430.1, 379, 402
See application file for complete search history.

(56) References Cited

U.S. PATENT DOCUMENTS 3,035,507 A * 5/1962 Gresham .......................... 454/52
3,839,988 A * 10/1974 Duerr ............................ 118/663
3,845,286 A * 10/1974 Aronstein et al. ............ 700/102
4,237,794 A * 12/1980 Biaggini ................. B60P 3/073 24/631
4,402,765 A * 9/1983 Goto ....................... C23C 22/00 118/423
4,512,869 A * 4/1985 Boccalatte ............. B62D 65/18 204/625
4,653,387 A * 3/1987 Osawa et al. ................... 454/51
4,770,122 A * 9/1988 Ichihashi et al. ............. 118/697
5,022,808 A * 6/1991 Blum ................... B65G 1/0435 414/260
5,075,132 A * 12/1991 Ogasawara ................... 427/557
5,094,891 A * 3/1992 Wren ......................... 427/430.1
5,194,302 A * 3/1993 Ruehl ........................... 427/346
5,255,806 A * 10/1993 Korzeniowski ...... B65D 88/121 206/599
5,319,840 A * 6/1994 Yamamoto et al. ............ 29/430
5,347,463 A * 9/1994 Nakamura ........... B23Q 7/1426 198/340
5,364,469 A * 11/1994 Wakabayashi ................ 118/423
5,487,636 A * 1/1996 Mkrtchyan .......... B65G 1/0435 414/245
5,584,759 A * 12/1996 Fabrizi ............................ 454/52
5,651,820 A * 7/1997 Ogasawara et al. ............ 118/66
5,664,323 A * 9/1997 Ishida et al. ..................... 29/822
5,681,619 A * 10/1997 Ogasawara ................... 427/379
5,707,199 A * 1/1998 Faller ......................... E04H 6/24 414/21
5,731,038 A * 3/1998 Ogasawara .......... B05D 3/0254 427/346
5,743,962 A * 4/1998 Ogasawara et al. .......... 118/643
5,769,949 A * 6/1998 Cienkus et al. .............. 118/621
5,989,401 A * 11/1999 Breneiser ................ C23C 22/00 204/484
6,077,017 A * 6/2000 Durant .................... E04H 6/186 414/254
6,197,175 B1 * 3/2001 Kisi ....................... C25D 13/22 204/198
6,217,652 B1 * 4/2001 Okubo et al. ................... 118/66
6,991,087 B2 * 1/2006 Krannich et al. .......... 198/465.1
7,293,505 B2 * 11/2007 Matsubara et al. ............. 104/89
2002/0162504 A1 * 11/2002 Kreuzer ............. B65G 49/0463 118/416
2003/0005885 A1 * 1/2003 Mueller et al. ............... 118/718
2003/0056682 A1 * 3/2003 Hill ........................ B62D 65/18 104/35
2003/0116179 A1 * 6/2003 Jarvis et al. ................. 134/95.3
2003/0136338 A1 * 7/2003 Pohl .................... B05B 12/1472 118/326
2004/0149542 A1 * 8/2004 Kyotani ........................ 198/375
2005/0061616 A1 * 3/2005 Krannich .................. B05C 3/10 198/377.01
2006/0054049 A1 * 3/2006 Cho ....................... B62D 65/18 104/172.3
2006/0068094 A1 * 3/2006 Cole ............................. 427/240
2006/0180470 A1 * 8/2006 Fage ...................... B62D 65/18 204/622
2007/0071585 A1 * 3/2007 Henkel ................ B65G 1/0407 414/471
2007/0256923 A1 * 11/2007 Schneider .................. 204/192.1
2007/0261953 A1 * 11/2007 Kohler ................... C25D 13/22 204/230.2
2008/0229608 A1 * 9/2008 Krizek .................... F26B 15/08 34/236
2009/0117283 A1 * 5/2009 Herre et al. .................. 427/402
2009/0277748 A1 * 11/2009 Spangler .............. B65G 35/066 198/345.3
2010/0008749 A1 * 1/2010 Spangler et al. ........ 414/222.13
2010/0200416 A1 * 8/2010 Hagihara .................. B05C 3/09 205/205
2010/0263191 A1 * 10/2010 Kllibarda ............... G06Q 10/06 29/430
2011/0165833 A1 * 7/2011 Schaefer ....................... 454/187
2012/0097099 A1 * 4/2012 Roeckle ............. B65G 49/0459 118/423
2012/0193307 A1 * 8/2012 Gardelle .............. B65G 1/0457 211/13.1
2013/0343843 A1 * 12/2013 Venkataraman ..... B65G 63/004 414/277
2014/0021054 A1 * 1/2014 Robbin ......................... 204/622
2014/0212247 A1 * 7/2014 Glickman ............ B65G 1/0464 414/267

FOREIGN PATENT DOCUMENTS

| | | | |
|---|---|---|---|
| DE | 10 2005 011 812 | A1 | 9/2006 |
| DE | 103 50 846 | B4 | 10/2007 |
| GB | 2 305 376 | A | 4/1997 |
| JP | H05-010049 | A | 1/1993 |
| JP | H06-212494 | A | 8/1994 |
| JP | 10-071353 | | 3/1998 |
| JP | H11-253855 | A | 9/1999 |
| JP | 2001-162221 | A | 6/2001 |

OTHER PUBLICATIONS

Office Action in German Application No. 10 2008 036 321.9 dated Nov. 10, 2008.
U.S. Appl. No. 13/015,715, filed Jan. 28, 2011.
Japanese Patent Office, Notice of Reasons for Rejection in Japanese Patent Application No. 2011-520422 (Jan. 28, 2014).

* cited by examiner

MULTILEVEL PAINT SHOP FOR PAINTING OBJECTS

RELATED APPLICATION

This application is a continuation application of PCT/EP2009/059104 filed Jul. 15, 2009, the entire specification of which is incorporated herein by reference.

FIELD OF DISCLOSURE

The present invention relates to a paint shop for painting objects to be painted in the form of vehicle bodies and/or parts of vehicle bodies, in particular driver's cabins for lorries.

BACKGROUND

The building dimensions of a paint shop for painting vehicle bodies are determined by the necessary process devices for painting the bodies such as, for example, dipping plants, driers, spray booths and work spaces, and also by the necessary transport and ventilation installations including the supply of materials and environmental management for waste water, waste materials and exhaust air.

In this case, only the position of the process devices within the paint shop can be changed and not their dimensions.

The transport installations are not themselves used for the surface treatment of the vehicle bodies, but solely for transporting the bodies between the individual process sections and/or for performing necessary functions such as colour sorting of the bodies and emptying process sections.

In the paint shops known hitherto these transport installations are without exception erected on previously defined floor levels within the paint shop. These floor levels must be provided in the building of the paint shop.

The position of the temporary storage areas for colour sorting and emptying process sections is determined both by the process sequence and by the free spaces available in the paint shop. The storage areas are arranged on a plurality of levels in order to keep the floor area of the paint shop building as small as possible.

In the known paint shops the ventilation installations are erected on steel platforms specially provided for them or even on special floor levels of the paint shop (penthouse) inside the paint shop building.

Pretreatment units and units for cataphoretic dip coating (abbreviated in the following to "CDC") are usually erected on two levels. In this case the heavy dip tanks filled with process liquid generally are located above the respective associated containers. Heavy steel platforms or concrete ceilings are required for this.

The driers and their heating units constantly emit heat to the surrounding area as a result of their radiant heat. This undesirable, but unavoidable, input of heat into the building of the paint shop must not have a negative influence on the work spaces. Therefore, in the known paint shops the driers and their heating units are respectively erected on platforms or building levels above the work spaces.

To be able to perform the transport- and plant-related functions of the paint shop, the paint shop building in known paint shops is erected over up to four levels and also on a substantially larger floor area than would be necessary for the painting processes alone.

The paint shop building must be designed statically according to the loads that are necessary as a result of the plant installations and transport installations with the bodies transported thereon as well as the steel or concrete levels necessary for erection.

Dangerous areas are caused in the paint shop as a result of the transport of bodies in the paint shop and also the necessary moving transport installations for these such as e.g. hoisting stations, shuttle wagons, swivel tables or turntables. Therefore, safety installations must be provided on a large scale in order to comply with the corresponding legal requirements and to exclude risks to people.

Compromises have to be made in many cases in designs of escape routes from the known paint shops because of the complexity of the paint shop building.

The scheduling times in the erection of known paint shops are determined by the multistorey design of the buildings and the therefore difficult assembly and commissioning of the plant installations.

Patent document DE 103 50 846 A1 discloses a processing assembly for the production of motor vehicles with a processing area, which consists of a base body finishing area, a painting area and an assembly area, and with a single central body storage unit as body logistics centre, into which bodies with different finishing status can be stored.

SUMMARY OF THE INVENTION

The object forming the basis of the present invention is to provide a paint shop for painting objects to be painted in the form of vehicle bodies and/or parts of vehicle bodies, which has a simple and clearly arranged structure, requires comparatively few transport-related installations and can be produced at low expense in terms of time and materials.

This object is achieved according to the invention by a paint shop for painting objects to be painted in the form of vehicle bodies and/or parts of vehicle bodies, which comprises the following:

- a building shell, which encloses a building interior, in which are arranged at least one dip tank and at least one open treatment area, which is open in relation to the building interior;
- a first transport level, on which objects to be painted can be transported through at least one open treatment area;
- a second transport level, from which objects to be painted can be dipped into at least one dip tank; and
- at least one intermediate storage unit, wherein at least one object to be painted can be transported from one transport level of the paint shop into the intermediate storage unit and later can be transported out of the intermediate storage unit into another transport level of the paint shop.

In this case, the transport levels, from which the object to be painted is transported into the intermediate storage unit and into which the object to be painted is transported out of the intermediate storage unit, can be the same as the first or second transport level of the paint shop or, if necessary, also comprise further transport levels of the paint shop.

The first and the second transport level of the paint shop lie on different levels in relation to the floor of the building shell of the paint shop.

The first transport level preferably lies below the second transport level of the paint shop.

The vertical spacing of the second transport level in relation to the first transport level is preferably greater than the greatest height of the objects to be painted.

The vertical spacing between the second transport level and the first transport level preferably amounts to at least about 4 m.

It is particularly favourable if the first transport level lies on the level of the ground floor level of the building shell of the paint shop.

In the paint shop according to the invention at least one intermediate storage unit is arranged between at least two process sections of the paint shop so that at least one process section terminates at the intermediate storage unit and at least one subsequent process section starts at the intermediate storage unit.

One or more of the following transport-related functions can preferably be performed in the intermediate storage unit:

objects to be painted can be transported between different transport levels of the paint shop by lifting or lowering the objects to be painted;

objects to be painted can be placed in the intermediate storage unit for storage during emptying of treatment areas of the paint shop;

objects to be painted that are temporarily stored in the intermediate storage unit can be retrieved from the intermediate storage unit for treatment in the process section of the paint shop following the intermediate storage unit;

by changing the sequence of retrieval the objects to be painted in relation to their storage sequence, colour blocks can be formed for the subsequent painting of the objects to be painted by means of the intermediate storage unit;

objects to be painted that are to be subsequently processed can be sorted in a sequence-optimised manner in the intermediate storage unit;

the process sections of the paint shop located before or after the intermediate storage unit in the direction of passage of the objects to be painted can be decoupled from one another in the case of plant failures;

in addition, the process sections of the paint shop located before or after the intermediate storage unit in the direction of passage of the objects to be painted can be decoupled from one another in the case of different work times in the different process sections.

The intermediate storage unit preferably comprises a plurality of storage bays for objects to be painted that can be selectively filled. In this case, the retrieval sequence of the objects to be painted can be changed in relation to the storage sequence of the objects to be painted in order to form colour blocks and/or to sort objects to be painted to be subsequently processed in a sequence-optimised manner.

It is additionally possible to store those objects to be painted that are the next ones to be retrieved from the intermediate storage unit as closely as possible to a retrieval position of the intermediate storage unit.

In a preferred configuration of the invention it is provided that the intermediate storage unit is configured as a high-bay storage unit.

It is particularly favourable if objects to be painted on the second transport level can be transported through at least one drier of the paint shop. In this case, the heating units for heating the drier can be erected below the driers on the first transport level, preferably on the ground floor level of the building shell (height 0.0 m).

It is additionally favourable if objects to be painted on the second transport level can be transported through at least one paint spray booth. In this case, the respective paint spray booth can be erected on a steel-framed platform, the platform level of which is consistent with the minimum structural height required for the paint spray wash-out unit. The paint spray wash-out unit can be arranged directly below the paint spray booth on the first transport level, preferably on the ground floor level of the building shell (height 0.0 m). The paint sludge disposal unit is preferably arranged in pits below the spray booth.

It is additionally favourable if objects to be painted on the first transport level can be transported through at least one underseal application unit. Work places for human workers that are particularly easy to reach on the first transport level, preferably on the ground floor level of the building shell (height 0.0 m), are located in such an underseal application unit.

The escape routes can also be kept particularly short when the work spaces for human workers are arranged on the first transport level.

It is additionally favourable if at least one separation device for separating paint overspray from the exhaust air of a paint spray booth and/or at least one device for disposing of the paint sludge are arranged on the first transport level.

In this case, a paint spray booth can be arranged directly above the separation device for separating paint overspray from the exhaust air of the paint spray booth and/or directly above the device for disposing of paint sludge on the second transport level of the paint shop.

It is additionally favourable if at least one air supply unit for supplying at least one paint spray booth with inlet air is arranged on the first transport level.

Because of the arrangement on the first transport level, the air supply unit is particularly easy to access for maintenance purposes (for a filter change, for example) and/or for repairs.

The air supply unit is preferably arranged on the ground floor level of the building shell (height 0.0 m). The air supply unit can be connected to a spray booth supplied by the air supply unit with inlet air by means of an air inlet duct.

It can also be provided that the paint shop comprises at least one exhaust air unit for removing exhaust air from at least one paint-spray booth, wherein the exhaust air unit is arranged outside the building shell on the level of the first transport level, preferably on the ground floor level of the building shell (height 0.0 m). Such an exhaust air unit can be connected to the paint-spray booth by means of at least one exhaust air duct, which preferably runs below the ground floor level of the building shell of the paint shop.

The exhaust air unit can include at least one ventilator.

Moreover, the exhaust air unit can be connected to an exhaust air flue by means of at least one further duct.

In a preferred configuration of the paint shop it is provided that at least one heating unit for heating at least one drier is arranged on the first transport level. As a result of this, the heating units do not have to be erected on platforms or additional building levels above the work spaces.

It is particularly favourable if all the process devices of the paint shop, i.e. all the devices, with which a treatment of the objects to be painted is conducted (treatment devices) or which are necessary for operation of these treatment devices, are assembled from the first transport level.

As process devices in the sense of this description and the attached claims, dip tanks, driers, cooling zones, spray booths, sealing work spaces, underseal application units, inspection work spaces and finishing work preparation work spaces in particular are considered as treatment devices and also heating units, air supply units and paint spray wash-out units are considered as devices necessary for operation of these treatment devices.

Transport devices are not considered as process devices of the paint shop in this description and in the attached claims.

It is particularly favourable if at least one associated container of at least one dip tank is arranged next to the respective dip tank on the first transport level.

Cylindrical upright containers are preferably to be used, since these are easier to manufacture and clean.

It is particularly favourable if the paint shop does not have any further floor levels besides the first transport level on the ground floor level of the building shell.

It is also advantageous if the paint shop comprises at least two intermediate storage units, by means of which objects to be painted can be transported from one transport level of the paint shop onto another transport level of the paint shop.

In this case, the at least two intermediate storage units can be configured in particular as two decentralised high-bay storage units.

By moving transport-related functions into the intermediate storage unit, the extent of transport installations required in the building shell of the paint shop outside the intermediate storage unit is significantly reduced.

Moreover, the process sections of the paint shop can be configured so that each process section terminates at an intermediate storage unit and/or starts at an intermediate storage unit.

The paint shop according to the invention is particularly easy to set up if every process device of the paint shop, i.e. every device, with which a treatment of the objects to be painted is conducted (treatment device) or which is necessary for operation of such a treatment device, is arranged either on the first transport level or is arranged on a framework, which extends upwards from a floor of the building shell arranged on the first transport level. In this case, there is no necessity to provide additional floor levels in the building shell of the paint shop besides the ground floor level.

A particularly favourable layout of the process sections of the paint shop is obtained if at least one intermediate storage unit is arranged directly adjacent to a wall of the building shell.

When a plurality of intermediate storage units are provided, these are preferably all arranged adjacent to the same external wall of the building shell.

In a preferred configuration of the paint shop it is provided that all the process devices of the paint shop, i.e. all devices, with which a treatment of the objects to be painted is conducted (treatment devices) or which are necessary for operation of these treatment devices, is arranged either on the first transport level or on the second transport level of the paint shop. A particularly simple structure of the transport route of the objects to be painted through the paint shop is achieved as a result of this.

In this case, the paint shop can also comprise further transport levels besides the first transport level, in particular a third transport level. However, in this case only transport devices of the paint shop and no process devices of the paint shop are arranged on this third transport level.

The solution according to the invention allows a "lean" paint shop to be erected with a low equipment expenditure and small space requirement.

In order to protect objects to be painted, which are stored in the intermediate storage unit for lengthy periods, from dust deposits and thus simplify the subsequent process steps, it can be provided that the intermediate storage unit is configured as a clean-room area.

In particular, it can be provided that storage bays of the intermediate storage unit for objects to be painted are respectively provided with a cover, which is arranged directly above the respective object to be painted. The object to be painted is protected from any falling dirt as a result.

The cover can in particular consist of a protective film.

The protective film can be made in particular from a suitable plastic material, e.g. from a polyethylene material.

The used cover preferably complies with the applicable fire protection regulations.

A paint shop according to the invention can have the following advantages in particular:

Because of the configuration of a paint shop according to the invention the volume of the building required for the paint shop is reduced to the dimension necessary for the painting process alone.

Since only one building shell without additional floor levels is required, the structure of the building of the paint shop is simplified and cost reductions area achieved as a result.

The extent of the transport-related installations necessary in the paint shop is significantly reduced.

Compared to the conventional structure, additional transport levels with the steel structure, walkways, fire protection installations, lighting and ventilation systems necessary for these, are rendered unnecessary in the paint shop.

The number and extent of protection installations for people can be significantly reduced as a result of the clearly arranged structure of the paint shop.

The maintenance expenses are reduced as a result of the substantial reduction of the number of drive motors and sensor systems for the transport installations and also because of the significantly reduced distances as a result of the centralisation of the transport-related installations in the intermediate storage unit.

The availability of the transport installations is clearly increased because of the significant reduction of the number of drive motors and sensor systems for the transport installations.

A clear cost reduction is achieved as a result of the simplification of the building structure and the plant technology.

The energy consumption is reduced as a result of the smaller number of drive motors for the transport installations.

A further reduction in energy consumption results from a reduced expenditure for the lighting and ventilation of the building shell.

In a paint shop according to the invention a plurality of identical process devices can be combined in connected areas of the first transport level, in which no process devices of a different type are arranged.

A strict division of the interior of the paint shop into different function areas is achieved as a result of this. The areas for work spaces, machine areas and process areas no longer overlap one another.

The interfaces between the building technology and the plant technology as well as within the plant technology, which comprises the steel structure, energy supply, ventilation installations and fire protection, are substantially simplified.

Since only one building shell without any further functions needs to be built, the set-up of the building for the paint shop is substantially simplified and the completion times for the erection of the paint shop can be reduced.

The assembly of the plant installations is clearly simpler if all the plants, in particular all the process devices, can be assembled from the 0.0 m level (ground floor level of the building shell).

The commissioning of the plant installations is also simpler, since the individual process sections of the paint shop can be set in operation independently of other process sections of the paint shop because of the decoupling by means of the at least one intermediate storage unit.

The paint shop design according to the invention is suitable in particular for paint shops in the automotive sector.

Further features and advantages of the invention are the subject of the following description and the drawing representing an exemplary embodiment.

BRIEF DESCRIPTION OF THE DRAWINGS

Identical or functionally equivalent elements are given the same reference numerals in all Figures.

DETAILED DESCRIPTION OF THE INVENTION

Figure 1:
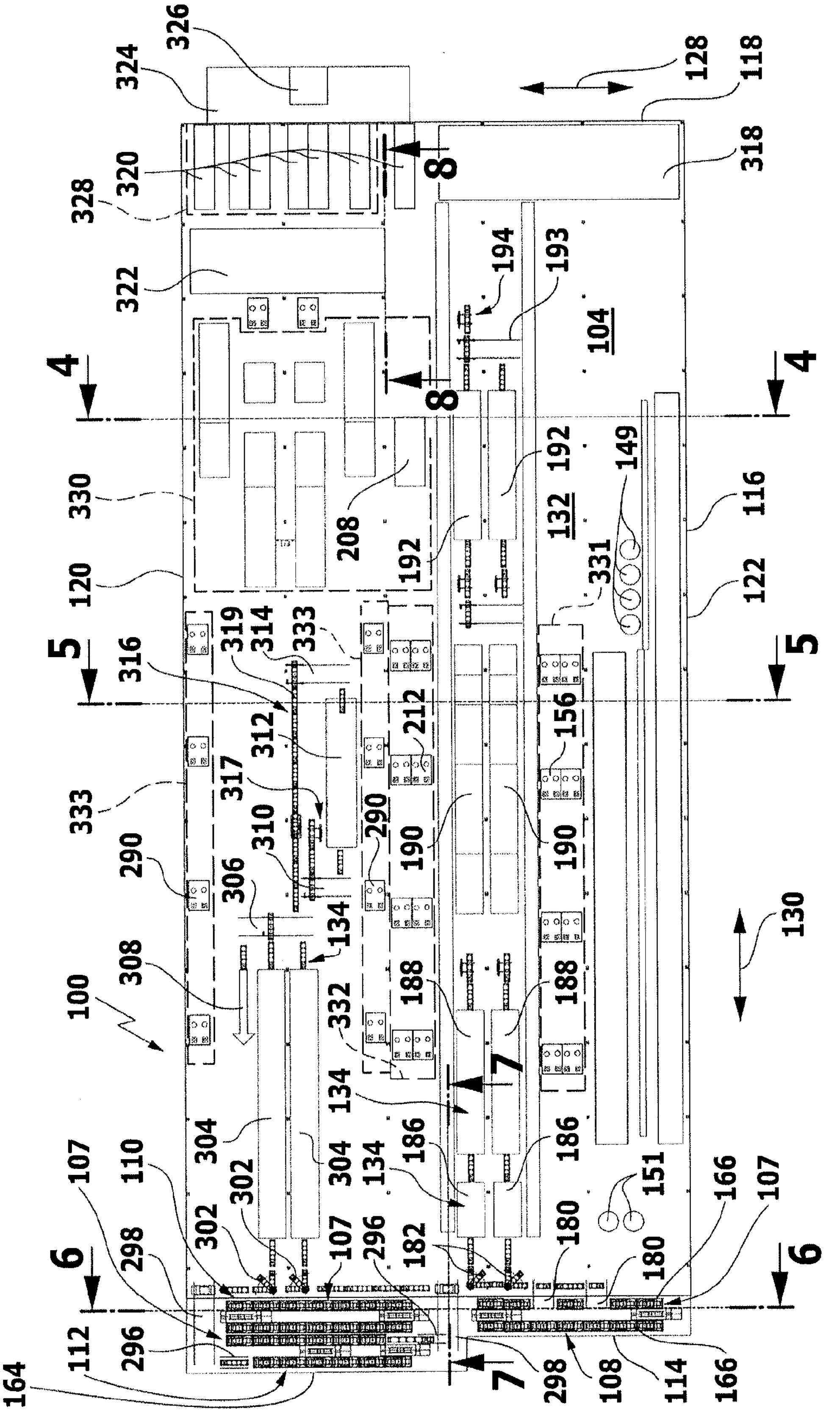
FIG. 1 is a schematic plan view of a first transport level of a paint shop for painting vehicle bodies.
Figure 2:
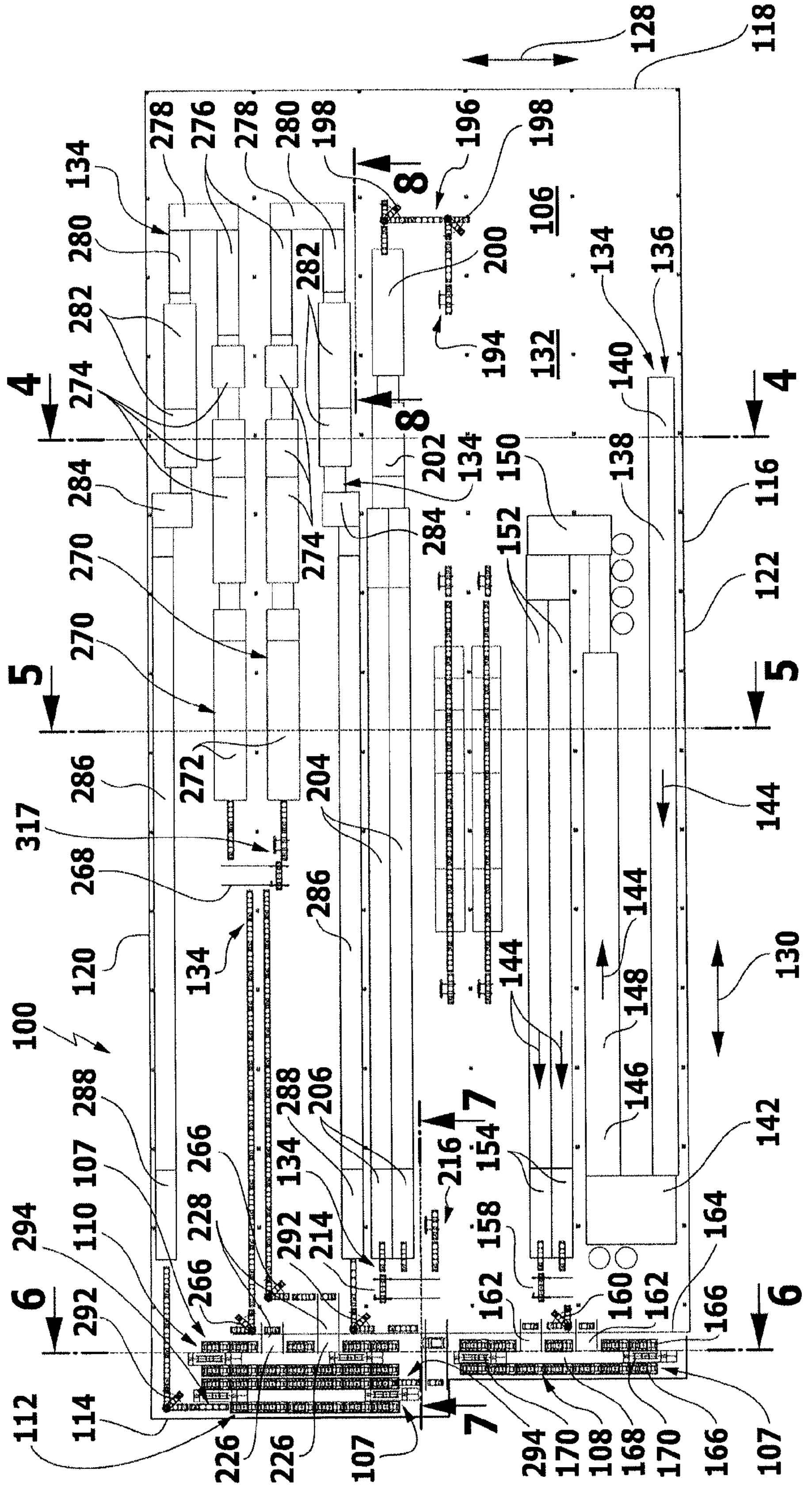
FIG. 2 is a schematic plan view of a second transport level of the paint shop for painting vehicle bodies.

A paint shop for painting vehicle bodies 102 shown in FIGS. 1 to 9 and given the overall reference 100 comprises a plurality of treatment areas for the surface treatment of the vehicle bodies 102, which are arranged on a first transport level 104 shown in FIG. 1 and on a second transport level 106 shown in FIG. 2 and through which the vehicle bodies 102 to be treated are successively transported.

Each treatment area is an associated with a process section of the paint shop 100, which terminates in one of three high-bay storage units 108, 110 or 112 of the paint shop 100 serving as intermediate storage unit 107 and/or starts in one of these high-bay storage units 108, 110 or 112.

Figure 3:
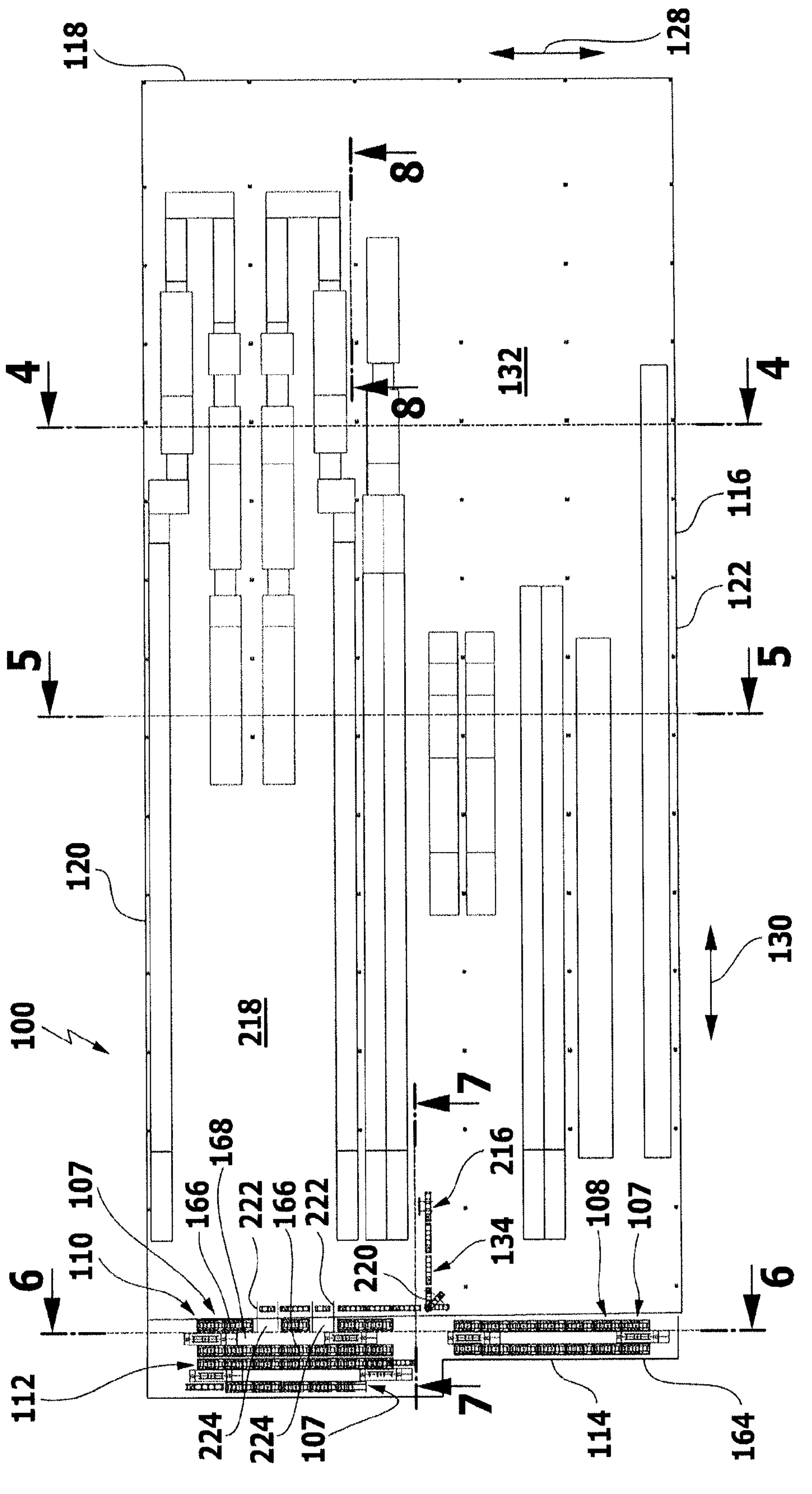
FIG. 3 is a schematic plan view of a third transport level of the paint shop for painting vehicle bodies.

The three high-bay storage units 108, 110 and 112 are arranged on a first face 114, shown on the left in FIGS. 1 to 3, of a building shell of the paint shop 100 given the overall reference 116.

Figure 4:
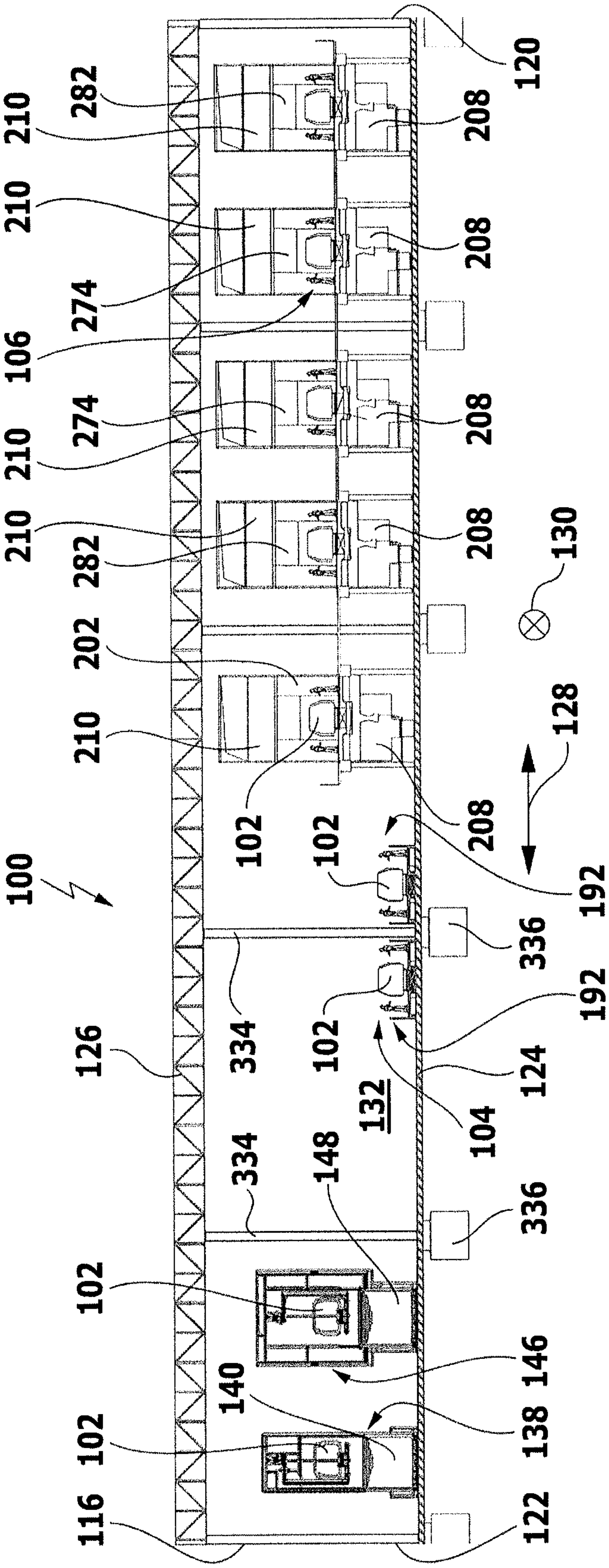
FIG. 4 shows a schematic vertical cross-section through the paint shop in the region of a pretreatment dip tank, a CDC dip tank and open sealing work spaces and in the region of spray booths for filler, primer and clear coat, taken along the lines 4-4 in FIGS. 1 to 3.
Figure 5:
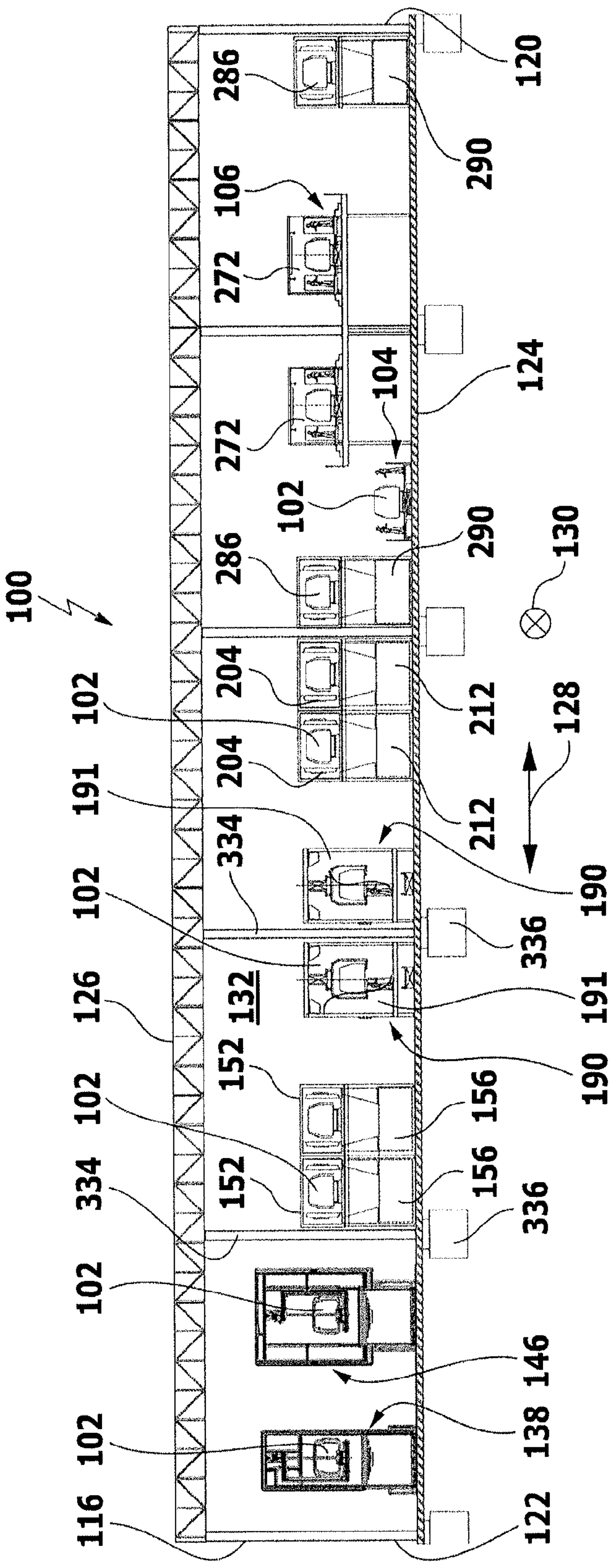
FIG. 5 shows a schematic vertical cross-section through the paint shop in the region of a pretreatment dip tank, a CDC dip tank, two CDC driers, two underseal application units, two filler driers, a top coat drier, an open finishing work preparation work space, two top coat preparation booths and a further top coat drier, taken along the lines 5-5 in FIGS. 1 to 3.

The building shell 116 of the paint shop 100 additionally comprises a second face 118 located opposite the first face 114 and two longitudinal sides 120 and 122 connecting the two faces 114 and 118 to one another as well as a horizontal floor 124 and a horizontal top wall 126 (see FIGS. 4 and 5).

The faces 114 and 118 of the paint shop 100 run substantially in a horizontal transverse direction 128 of the paint shop 100, while the longitudinal sides 120 and 122—that are configured longer than the faces 114 and 118—run substantially in a horizontal longitudinal direction 130 of the paint shop running perpendicularly to the transverse direction 128.

The faces 114, 118, the longitudinal sides 120, 122, the floor 124 and the top wall 126 of the building shell 116 of the paint shop 100 jointly enclose a building interior 132, in which are arranged the treatment areas and the high-bay storage units 108, 110, 112 of the paint shop 100, through which the vehicle bodies 102 are transported one after the other along a transport route 134.

The transport route 134 of the vehicle bodies 102 through the paint shop 100 starts at an entry point 136 located on the second transport level 106 shown in FIG. 2. The vehicle bodies 102 from a body shell construction plant enter the paint shop 100 at this location.

A pretreatment unit 138 with pretreatment dip tank 140 extends from the entry point 136 in the longitudinal direction 130 of the paint shop 100 towards the first face 114. A turning area 142, in which the transport direction 144 of the vehicle bodies 102 is rotated 180°, connects to the treatment line 138. A CDC unit 146 ("CDC" stands for "cataphoretic dip coating") with at least one CDC dip tank 148, which extends in the longitudinal direction 130 of the paint shop 100 towards the second face 118, connects to the turning area 142.

A number of, preferably four, substantially cylindrical containers 149 associated with the pretreatment dip tank 140 are arranged on the first transport level 104 next to the pretreatment dip tank 140.

A number of preferably two, containers 151 associated with the CDC dip tank 148 are arranged on the first transport level 104 next to the turning area 142.

A further turning area 150, in which the transport direction 144 of the vehicle bodies 102 is once again turned 180°, follows the CDC unit 146.

After the turning area 150 the transport route 134 of the vehicle bodies 102 branches into two CDC continuous-flow driers 152, which extend parallel to one another towards the first face 114 in the longitudinal direction 130 and respectively terminate in a cooling zone 154.

Figure 7:
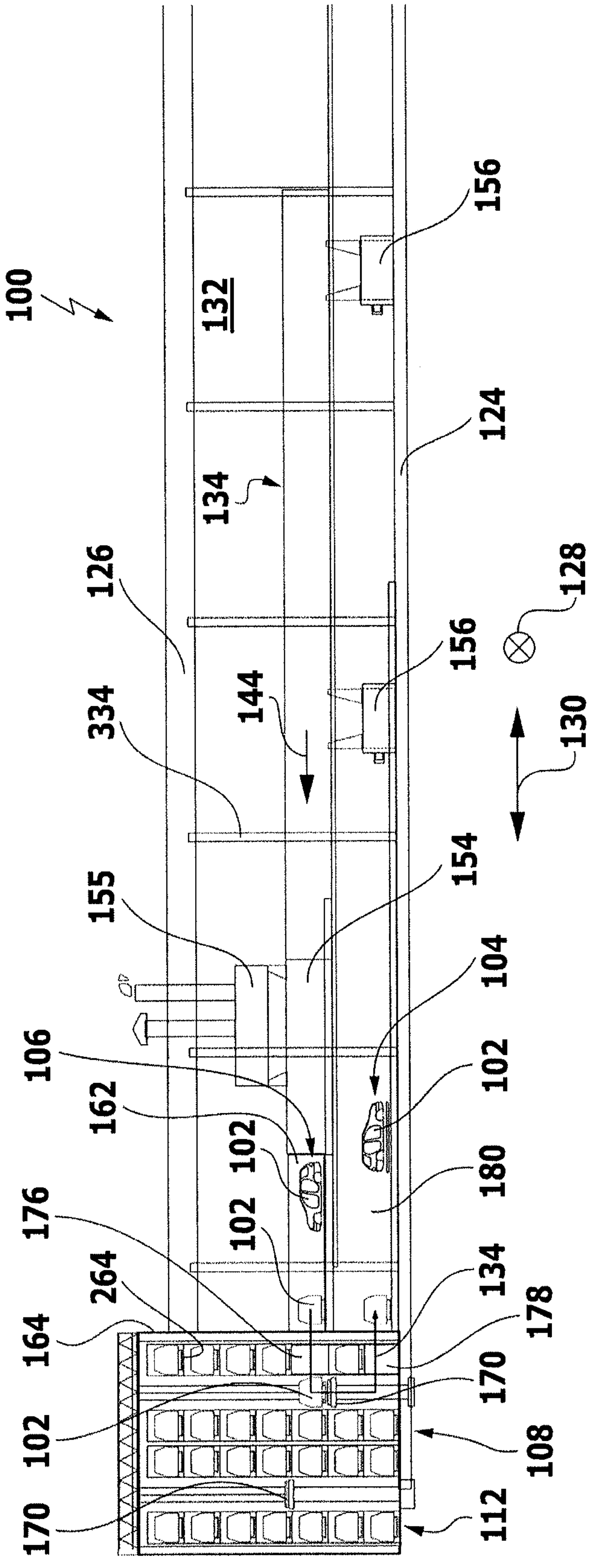
FIG. 7 shows a schematic vertical longitudinal section through a region of the paint shop with two high-bay storage units and a filler drier with heating units and cooling zone as well as an entry tunnel to a high-bay storage unit, taken along the lines 7-7 in FIGS. 1 to 3.

An air supply/exhaust air unit 155 for the respective cooling zone 154 is arranged above each cooling zone 154 (see FIG. 7).

A plurality of heating units 156, which are located on the first transport level 104 and stand on the floor 124 of the building shell 116, are respectively arranged below each of the CDC continuous-flow driers 152 (See FIG. 5).

These heating units 156 supply heated inlet air, which is fed into the drying tunnel of the CDC continuous-flow driers 152.

As may be seen from FIG. 2, following the cooling zones 154 of the CDC continuous-flow driers 152 is a cross conveyor 158, which alternately transports vehicle bodies 102 from the two cooling zones 154 to a swivel table 160, on which the vehicle bodies 102 are swivelled 90° around a vertical axis, so that they are then no longer oriented parallel to the longitudinal direction 130, but parallel to the transverse direction 128 of the paint shop 100.

From the swivel table 160 the vehicle bodies 102 pass through one of two entry tunnels 162 into the first high-bay storage unit 108, which is separated from the building interior 132 by an airtight housing 164.

The high-bay storage unit 108 comprises two storage shelves 166 for vehicle bodies 102, which extend parallel to the transverse direction 128 of the paint shop 100 and are separated from one another by an aisle 168, in which two storage and retrieval units 170 are arranged to travel in the transverse direction 128.

Figure 6:
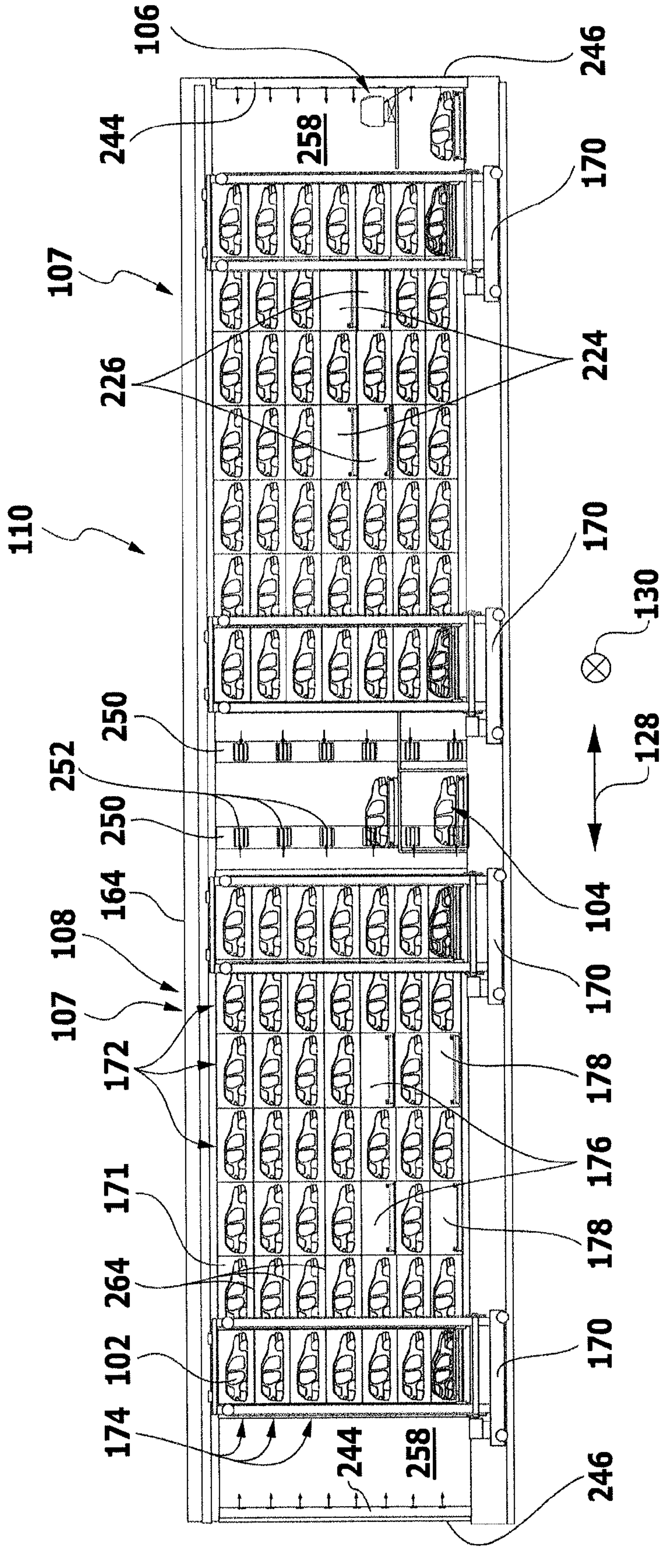
FIG. 6 shows a schematic vertical cross-section through two high-bay storage units, taken along the lines 6-6 in FIGS. 1 to 3.

Each of the storage shelves 166 has a plurality of body storage bays 171, which are arranged one above the other in a plurality of vertical columns 172 and next to one another in a plurality of horizontal rows 174 (see FIG. 6).

Two of the bays on the second transport level 106 serve as storage positions 176 for the first high-bay storage unit 108. The vehicle bodies 102 are transported onto these positions through the entry tunnels 162.

One of the two storage and retrieval units 170 respectively picks up a delivered vehicle body 102 from one of these storage positions 176 and transports the vehicle body 102 into a free body storage bay 171 for intermediate storage.

If the respective vehicle body 102 is to be further processed, it is removed from its body storage bay 171 and transported by a storage and retrieval unit 170 to one of two retrieval positions 178, which are arranged on the level of the first transport level 104 of the paint shop 100.

It is also possible to transport a vehicle body 102 directly from a storage position 176 to a retrieval position 178 of the first high-bay storage unit 108 by means of a storage and retrieval unit 170.

From these retrieval positions 178 the vehicle bodies 102 on the first transport level 104 are transported out of the first high-bay storage unit 108 through exit tunnels 180 (see FIG. 1) to swivel tables 182, on which the orientation of the vehicle bodies 102 is rotated 90° around a vertical axis, so that the vehicle bodies 102 are oriented parallel to the longitudinal direction 130 of the paint shop 100 again.

The pretreatment unit 138, the CDC unit 146 and the CDC continuous-flow driers 152 with the cooling zones 154 together form a first process section 184 of the paint shop 100, which starts at the entry point 136 of the paint shop 100 on the second transport level 106 and terminates at the entry tunnels 162 of the first high-bay storage unit 108 on the second transport level 106.

The treatment areas of the first process section 184 are all located on the second transport level 106.

From the swivel tables 182 on the first transport level 104 the transport route 134 of the vehicle bodies 102 extends in two parallel lines in the longitudinal direction 130 of the paint shop 100 towards the second face 118 and through a series of open treatment areas or work spaces, namely through a respective CDC inspection area 186, through a respective seam sealing area 188, through a respective underseal application unit 190 and through a respective fine sealing area 192 to a cross conveyor 193 and a hoisting assembly 194.

The underseal application units 190 comprise both underseal application booths 191 (see FIG. 5) and treatment areas and work spaces open towards the building interior 132.

The hoisting assembly 194 transports the vehicle bodies 102 from the first transport level 104 shown in FIG. 1 onto the second transport level 106 shown in FIG. 2. On the second transport level 106 a turning area 196 adjoins the hoisting assembly 194 and has two swivel tables 198, in which the orientation of the vehicle bodies 102 is respectively rotated 90° around a vertical axis, so that the vehicle bodies 102 are rotated 180° in total in the turning area 196.

Adjoining the turning area 196 are a cleaning booth 200 and a filler spray booth 202, in which the vehicle bodies 102 are provided with a coating of a filler material by means of paint robots.

After the filler spray booth 202 the transport route 134 of the vehicle bodies 102 branches into two filler continuous-flow driers 204, which extend parallel to the longitudinal direction 130 of the paint shop 100 towards the first face 114 and respectively terminate in a cooling zone 206.

As may best be seen from FIG. 4, a paint spray wash-out unit 208 located on the first transport level 104 and standing on the floor 124 of the building shell 116 is arranged under the filler spray booth 202.

As can also be seen from FIG. 4, an inlet air plenum system 210 is arranged above the filler spray booth 202.

An inlet air current is fed by the inlet air plenum system 210 to the filler spray booth 202 located below it and takes up paint overspray in the filler spray booth 202, which is washed out of the air current in the paint spray wash-out unit 208 located below the filler spray booth 202.

As may best be seen from FIG. 5, heating units 212 are provided below the filler continuous-flow driers 204 for generating the hot air to be fed to the filler continuous-flow driers 204.

The heating units 212 are located on the first transport level 104 of the paint shop 100 and stand on the floor 124 of the building shell 116.

A cross conveyor 214, by means of which the vehicle bodies 102 can be transported to a hoisting assembly 216 after passing through the cooling zones 206, adjoins the cooling zones 206 of the filler continuous-flow driers 204 in the transport route 134 of the vehicle bodies 102.

The hoisting assembly 216 transports the vehicle bodies 102 from the second transport level 106 onto a third transport level 218 of the paint shop 100 shown in FIG. 3.

The third transport level 218 lies above the second transport level 106, which in turn lies above the first transport level 104.

For example, the third transport level 218 lies at a height of approximately 7.5 m above the floor 124, while the second transport level 106 lies at a height of approximately 5.0 m above the floor 124 and the first transport level 104 lies at the level of the floor 124.

The vehicle bodies 102 are transported by the hoisting assembly 216 to a swivel table 220, which rotates the vehicle bodies 102 around an angle of 90° around a vertical swivel axis, so that the vehicle bodies 102 are then oriented parallel to the transverse direction 128 of the paint shop 100.

In this orientation the vehicle bodies 102 are respectively transported to one of two entry tunnels 222 of the second high-bay storage unit 110.

The vehicle bodies 102 pass through the entry tunnels 222 to two storage positions 224 of the second high-bay storage unit 110 (see FIG. 6) located on the level of the third transport level 218.

From these storage positions 224 the vehicle bodies 102 are transported by means of two storage and retrieval units 170 of the second high-bay storage unit 110 into a respective vacant body storage bay 171 and set down there.

For the further treatment of a vehicle body 102 this is transported out of its body storage bay 171 by means of one of the storage and retrieval units 170 to one of two retrieval positions 226 of the second high-bay storage unit 110 located on the level of the second transport level 106 of the paint shop 100.

From these retrieval positions 226 the vehicle bodies 102 are respectively transported out of the second high-bay storage unit 110 through one of two exit tunnels 228 (see FIG. 2).

The CDC inspection areas 186, the seam sealing areas 188, the underseal application units 190, the fine sealing areas 192, the cleaning booth 200, the filler spray booth 202 and the filler continuous-flow driers 204 with their cooling zones 206 belong to a second process section 230 of the paint shop 100, which starts at the first high-bay storage unit 108 on the first transport level 104 and terminates at the second high-bay storage unit 110 on the third transport level 218.

In this case, the CDC inspection areas 186, the seam sealing areas 188, the underseal application units 190 and the fine sealing areas 192 are located on the first transport level 104, while the cleaning booth 200, the filler spray booth 202 and the filler continuous-flow driers 204 with their cooling zones 206 are located on the second transport level 106.

All the treatment areas of the second process section 230 are therefore located on the first transport level 104 or on the second transport level 106 of the paint shop 100.

The second high-bay storage unit 110, like the first high-bay storage unit 108 and the third high-bay storage unit 112 to be described below, is configured as a clean-room area.

In particular, each of the high-bay storage units is enclosed by an airtight housing 164, which separates the interior of the high-bay storage unit from the building interior 132 of the building shell 116, so that no contaminants can pass from the building interior 132 into the interior of the housing 164 of the respective high-bay storage area.

The interior of the housings 164 of the high-bay storage units is only accessible via the respective entry tunnels 162, 222 and via the respective exit tunnels 180, 228.

Figure 9:
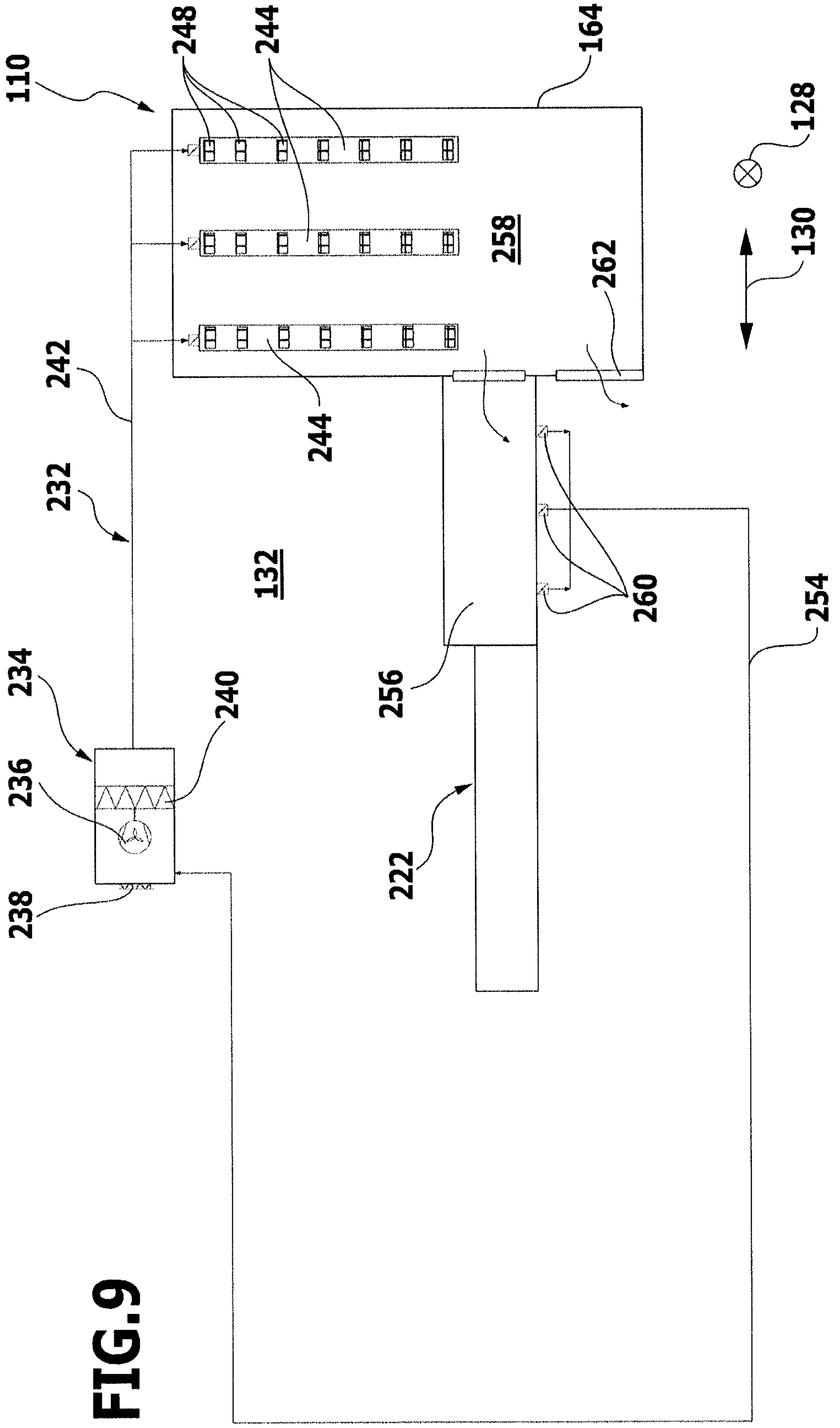
FIG. 9 is a schematic representation of the ventilation installations for a high-bay storage unit of the paint shop with an entry tunnel comprising an entry lock chamber and an air circulation unit for generating an excess pressure in a housing of the high-bay storage unit.

To prevent contaminants from passing through these tunnels into the interior of the housing 164, the interior of each high-bay storage unit is placed under an excess pressure of at least approximately 100 Pa, preferably of at least approximately 50 Pa, relative to the air pressure in the building interior 132 by means of an air circulation unit 232 shown schematically in FIG. 9.

As may be seen from FIG. 9, the air circulation unit 232 comprises an air supply device 234 with a fan 236, which sucks air out of the building interior 132 through an intake 238 and transports it through an air filter 240 into an air inlet pipe 242.

The air inlet pipe 242 branches into a number of, e.g. three, air inlet ducts 244, which extend in vertical direction along an end wall 246 of a high-bay storage unit (see FIG. 6).

From these air inlet ducts 244 the inlet air discharges through inlet air openings 248 of the air inlet ducts 244 arranged one above the other in vertical direction into the interior 258 of the high-bay storage unit.

Close to the opposite face of the high-bay storage unit, one or more exhaust air ducts 250 are provided, which also extend in vertical direction along a boundary wall of the housing 164 of the respective high-bay storage unit and have exhaust air openings 252 arranged vertically one above the other, through which air is sucked out of the interior 258 of the housing 164 of the high-bay storage unit into an exhaust air pipe 254 shown in FIG. 9.

The connection between the exhaust air ducts 250 and the exhaust air pipe 254 is not shown in FIGS. 6 and 9.

As shown in FIG. 6, the two high-bay storage units 110 can be arranged in a common housing 164, so that air can pass unhindered from the first high-bay storage unit 108 to the second high-bay storage unit 110 or in the reverse direction.

Alternatively, it can also be provided that each of the high-bay storage units 108, 110 has its own housing 164, which is separated in an airtight manner from the housing of the respective other high-bay storage unit.

As may be seen from FIG. 9, each entry tunnel of a high-bay storage unit, e.g. the entry tunnel 222 of the second high-bay storage unit 110, additionally comprises an entry lock chamber 256, into which flows inlet air from the interior 258 of the housing 164 of the high-bay storage unit, e.g. the second high-bay storage unit 110, standing under excess pressure.

This inflowing inlet air prevents air from passing out of the building interior 132 through the entry tunnel 222 into the interior 258 of the housing 164.

The lock chamber air is sucked out of the entry lock chamber 256 into the exhaust air pipe 254 through air flaps 260.

The exhaust air pipe 254 opens into the air supply device 234 of the air circulation unit 232 on the suction side of the ventilator 236, so that the air circulation circuit from the air supply device 234 through the interior 258 of the housing 164 of the high-bay storage unit and possibly through the entry lock chamber 256 of the high-bay storage unit is closed.

Like the entry tunnels 222 of the second high-bay storage unit 110, the entry tunnels of the remaining high-bay storage units are also provided with an entry lock chamber 256 with circulating air flowing through it.

Similarly, the exit tunnels of all the high-bay storage units are likewise provided with a correspondingly configured exit lock chamber.

To keep the excess pressure in the interior 258 of the housing 164 of the high-bay storage unit at the desired level, a portion of the inlet air supplied to the housing 164 is discharged directly into the building interior 132 through outlets 262 (see FIG. 9) of the housing 164.

The air lost to the air circulation circuit as a result of this is replaced by suction through the intake 238 of the air supply device 234.

To prevent dirt from dropping onto the vehicle bodies 102 stored in the body storage bays 171 from above, each body storage bay 171 is provided with a cover 264 arranged above the respective storage space for a vehicle body 102 (see FIG. 6).

This cover 264 can in particular be configured as a protective film of a suitable plastic material, e.g. polyethylene.

The protective film used as cover 264 complies with the respectively applicable fire protection regulations.

The cover 264 in particular prevents contaminants from the storage and retrieval unit 170 or from a vehicle body transport skid, on which a vehicle body 102 is arranged, from being able to drop onto a vehicle body 102 stored in a lower body storage bay 171 when storing or retrieving a vehicle body 102 in a further body storage bay 171 arranged above the body storage bay 171.

From the exit tunnels 228 of the second high-bay storage unit 110, the vehicle bodies 102 on the second transport level 106 are transported to a respective swivel table 266, which swivels the vehicle bodies 102 around an angle of 90° around a vertical axis, so that the vehicle bodies 102 are then oriented parallel to the longitudinal direction 130 of the paint shop 100.

In this orientation the vehicle bodies 102 on the second transport level 106 of the paint shop 100 are transported to a cross conveyor 268, which distributes the vehicle bodies 102 onto two top coat lines 270.

In each of these top coat lines 270, a top coat preparation booth 272, multiple primer spray booths 274 and an intermediate continuous-flow drier 276 respectively follow one another in the transport route 134 of the vehicle bodies 102 and all extend in the longitudinal direction 130 of the paint shop 100 towards the second face 118.

As may best be seen from FIG. 4, in this case a paint spray wash-out unit 208, which is located on the first transport level 104 and stands on the floor 124 of the building shell 116, is arranged under each primer spray booth 274.

Moreover, an inlet air plenum system 210 is respectively arranged above each primer spray booth 274.

A turning area 278 in the form of an air lock, in which the orientation of the vehicle bodies 102 is rotated around an angle of 180°, respectively adjoins the intermediate continuous-flow drier 276 of each top coat line 270.

A cooling zone 280, a plurality of clear coat spray booths 282, an evaporation zone 284, a top coat continuous-flow drier 286 and a cooling zone 288 respectively adjoin the turning area 278 of each top coat line 270 in the transport route 134 of the vehicle bodies 102 and respectively extend in the longitudinal direction 130 of the paint shop 100 towards the first face 114 of the building shell 116.

As may best be seen from FIG. 4, in this case paint spray wash-out units 208 located on the first transport level 104 of the paint shop 100 and standing on the floor 124 of the building shell 116 are respectively arranged below the clear coat spray booths 282 in this case.

An inlet air plenum system 210 is respectively arranged above each of the clear coat spray booths 282.

As can be seen from FIG. 5 in particular, a plurality of heating units 290 located on the first transport level 104 of the paint shop 100 and standing on the floor 124 of the building shell 116 are respectively arranged under the top coat continuous-flow driers 286.

From the cooling zones 288 the vehicle bodies 102 are transported to a respective swivel table 292, which swivels the vehicle bodies 102 around an angle of 90° around a vertical axis, so that the vehicle bodies 102 are then oriented parallel to the transverse direction 128 of the paint shop 100.

In this orientation the vehicle bodies 102 are respectively transported through one of two entry tunnels 294, which are respectively provided with an entry lock chamber, on the second transport level 106 into the third high-bay storage unit 112 of the paint shop 100.

From storage positions of the third high-bay storage unit 112, which are located on the level of the second transport level 106, the vehicle bodies 102 are transported to body storage bays 171 of the third high-bay storage unit 112 by means of storage and retrieval units 170.

From the body storage bays 171 the vehicle bodies 102 for further treatment are transported by means of the storage and retrieval units 170 to retrieval positions of the third high-bay storage unit 112 on the level of the first transport level 104 of the paint shop 100.

Viewed in the longitudinal direction 130 of the paint shop 100, the third high-bay storage unit 112 is arranged behind the second high-bay storage unit 110 on the first face 114 of the building shell 116 and therefore between the first face 114 and the second high-bay storage unit 110.

From the retrieval positions of the third high-bay storage unit 112 the vehicle bodies 102 pass through exit tunnels 296 of the third high-bay storage unit 112, which respectively comprise an exit lock chamber, on the first transport level 104 of the paint shop 100 (see FIG. 1) to a respective cross conveyor 298.

The top coat lines 270 with the top coat preparation booths 272, the primer spray booths 274, the intermediate continuous-flow driers 276, the cooling zones 280, the clear coat spray booths 282, the evaporation zones 284 and the top coat continuous-flow driers 286 with the cooling zones 288 belong to a third process section 300 of the paint shop 100, which starts at the exit tunnels 228 of the second high-bay storage unit 110 on the second transport level 106 of the paint shop 100 and terminates at the entry tunnels 294 of the third high-bay storage unit 112 on the second transport level 106 of the paint shop 100.

All the treatment areas of the third process section 300, i.e. the top coat lines 270 with the top coat preparation booths 272, the primer spray booths 274, the intermediate continuous-flow driers 276, the cooling zones 280, the clear coat spray booths 282, the evaporation zones 284 and the top coat continuous-flow driers 286 with the cooling zones 288, are located on the second transport level 106 of the paint shop 100.

In the manner already described above in association with the second high-bay storage unit 110, the third high-bay storage unit 112 is configured as a clean-room area that is separated from the building interior 132 of the building shell 116.

From the cross conveyors 298 on the first transport level 104 of the paint shop 100, the vehicle bodies 102 pass to swivel tables 302, which swivel the vehicle bodies 102 around an angle of 90° around a vertical axis, so that the vehicle bodies 102 are then oriented parallel to the longitudinal direction 130 of the paint shop 100 again.

In this orientation the vehicle bodies 102 on the first transport level 104 of the paint shop 100 are respectively transported through one of two finishing and inspection areas 304.

Adjoining the finishing and inspection areas 304 in the transport route 132 of the vehicle bodies 102 is a cross conveyor 306, which transports the vehicle bodies 102 to an exit point 308 of the paint shop 100, from where the finished painted vehicle bodies 102 pass to a final assembly plant.

If finishing work is necessary on a vehicle body 102, this is transported by the cross conveyor 306 to a finishing feed conveyor 319, from where the respective vehicle body 102 passes into a finishing work preparation area 312 by means of a cross conveyor 314.

After the finishing work preparation has been concluded, the vehicle body 102 is transported by means of a cross conveyor 310 and a hoisting assembly 317 adjoining it to the entry of one of the top coat preparation booths 272 on the second transport level 106 to then be painted again.

The finishing and inspection areas 304 as well as the finishing work preparation area 312 belong to a fourth process section 316 of the paint shop 100, which starts at the exit tunnels 296 of the third high-bay storage unit 112 on the first transport level 104 and terminates at the exit point 308 of the paint shop 100 on the first transport level 104 of the paint shop 100.

All the treatment areas of the fourth process section 316, i.e. the finishing and inspection areas 304 and the finishing work preparation area 312, are located on the first transport level 104 of the paint shop 100.

As may best be seen from FIG. 1, a colour mixing chamber 318, which is arranged between the fine sealing areas 192 of the second process section 230 and the second face 118 of the building shell 116, is additionally located on the first transport level 104 of the paint shop 100.

Moreover, multiple air supply units 320 are located on the first transport level 104 that serve to supply the inlet air plenum systems 210 of the filler spray booths 202, the primer spray booths 274 or the clear coat spray booths 282 and are arranged between the paint spray wash-out units 208 of these spray booths, on one side, and the second face 118 of the building shell 116, on the other side.

Figure 8:
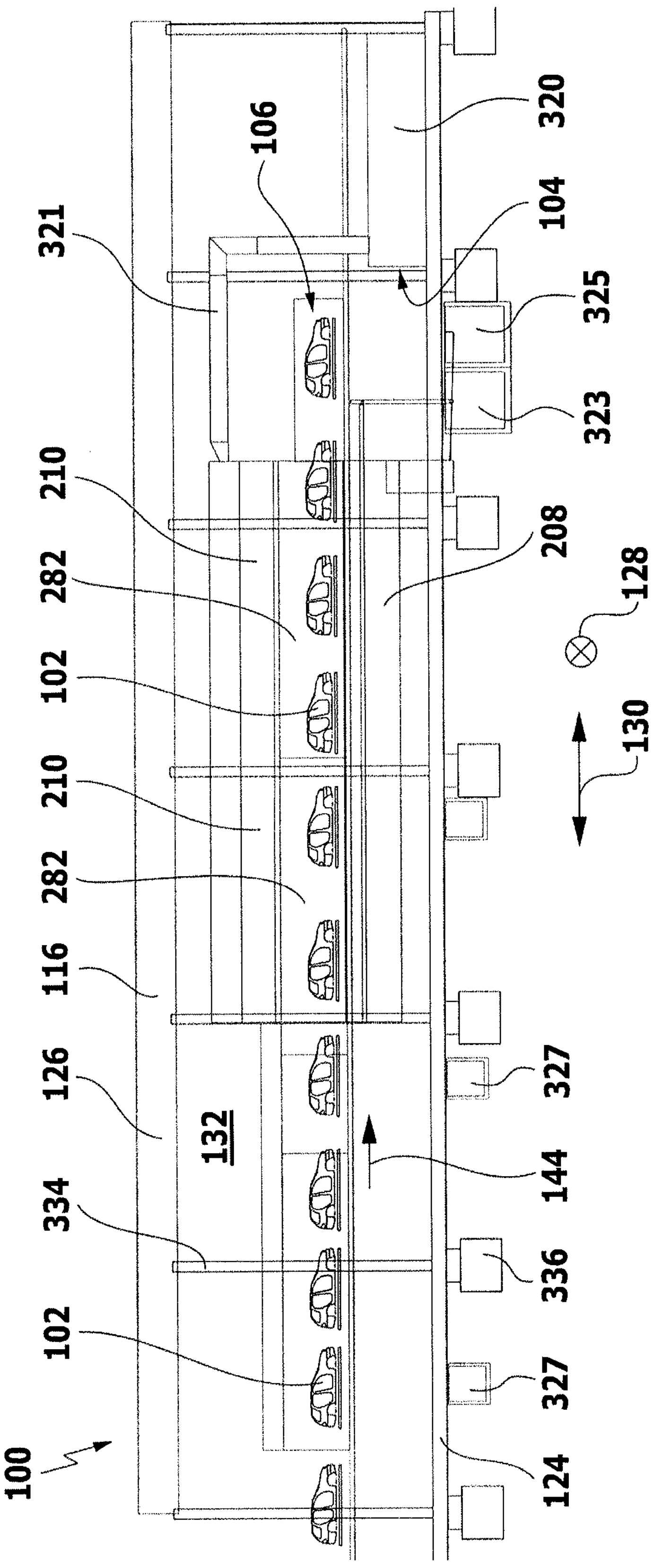
FIG. 8 shows a schematic vertical longitudinal section through a region of the paint shop with spray booths for clear coat, an air supply unit for the spray booths and paint coagulation units for water-based paint and solvent-based paint, taken along the lines 8-8 in FIGS. 1 to 3.

The air supply units 320 are connected to the respectively associated inlet air plenum systems 210 of the spray booths via air inlet ducts (see FIG. 8).

Moreover, in the same area on the first transport level 104 of the paint shop 100 a paint sludge disposal area 322 is provided for further processing of the paint overspray washed out of the booth exhaust air by the paint spray wash-out units 208 and is arranged between the air supply units 320, on the one side, and the paint spray wash-out units 208, on the other side.

The paint sludge disposal area 322 can comprise paint coagulation units 323 for water-based paint and/or paint coagulation units 325 for solvent-based paint arranged under the floor 124 of the building shell 116.

Adjacent to the air supply units 320 an exhaust air unit 324, which sucks exhaust air out of the spray booths through exhaust air ducts 327 arranged under the floor 124 of the building shell 116 and discharges it to an exhaust air flue 326, is arranged outside the building shell 116 on the second face 118 of the building shell 116.

The air supply units 320 all lie inside a substantially rectangular cohesive area 328 of the first transport level 104, in which no other process devices of the paint shop 100 are arranged.

Similarly, the paint spray wash-out units 208 lie in a substantially rectangular cohesive area of the first transport level 104, given the reference 330, in which no other process devices of the paint shop 100 are arranged.

The heating units 156 of the CDC continuous-flow driers 152 all lie in a substantially rectangular cohesive area 331 of the first transport level 104 of the paint shop 100, in which no other process devices of the paint shop 100 are arranged.

The heating units 212 of the filler continuous-flow driers 204 also all lie in a substantially rectangular cohesive area 332 of the first transport level 104 of the paint shop 100, in which no other process devices of the paint shop 100 are arranged.

The heating units 290 of the top coat continuous-flow driers 286 also all respectively lie in a substantially rectangular cohesive area 333 of the first transport level 104 of the paint shop 100, in which no other process devices of the paint shop 100 are arranged.

Because of the clear division of the first transport level 104 of the paint shop and the grouping of process devices of like type in the respective cohesive areas 328, 330, 331, 332 and 333 of the first transport level 104, areas for open work spaces, machine areas and process areas do not overlap one another, and in particular the radiation of heat from the heating units 156, 212 and 290 of the continuous-flow driers does not have an adverse effect on the other process devices and work spaces.

As may best be seen from FIGS. 4 and 5, the top wall 126 of the building shell 116 is supported by vertical posts 334 that extend from the floor 124 of the building shell 116 as far as the top wall 126.

Under the floor 124 a concrete foundation 336 is respectively provided in the region of each post 334.

The paint shop 100 described above operates as follows:

Vehicle bodies 102 assembled in a shell assembly area are transported at the entry point 136 of the paint shop 100 into the first process section 184 of the paint shop 100 and pretreated in this first process section 184 and provided with a cataphoretic dip coating. In addition, the applied dip coating is dried in the first process section 184.

In this case, the vehicle bodies 102 are transported through the pretreatment dip tank 140 and the CDC dip tank 148 suspended from an overhead conveyor, wherein the vehicle bodies 102 are dipped into the said dip tanks by lowering the overhead conveyor track from the second transport level 106.

Alternatively, the vehicle bodies 102 could also be transported through the first process section 184 on rotary carriers, wherein the vehicle bodies 102 can be dipped into the dip tanks 140 and 148 of the first process section 184 by a rotation around a horizontal axis from the second transport level 106 and can be removed from this tank again by a further rotation around this axis.

From the first process section 184 the vehicle bodies 102 pass into the first high-bay storage unit 108, into which the vehicle bodies 102 on the second transport level 106 are transported and from which the vehicle bodies 102 on the first transport level 104 are transported out again.

Before leaving the first high-bay storage unit 108 the vehicle bodies 102 can be temporarily stored in a body storage bay 171.

The vehicle bodies 102 can be retrieved from the first high-bay storage unit 108 in a retrieval sequence differing from the storage sequence, so that the treatment sequence of the vehicle bodies 102 can be changed between the first process section 184 and the second process section 230.

In this way, paint blocks can be formed for the subsequent painting operation and/or bodies for finishing work can be sorted in a sequence-optimised manner.

The transport of the vehicle bodies 102 from the second transport level 106 onto the first transport level 104 occurs within the first high-bay storage unit 108 by means of the storage and retrieval units 170.

After leaving the first high-bay storage unit 108 on the first transport level 104, the vehicle bodies 102 are sealed in the second process section 230 of the paint shop 100, provided with underbody protection, then hoisted from the first transport level 104 to the second transport level 106 and on the second transport level 106 are painted with a filler that is then dried.

After the filler has dried, the vehicle bodies 102 are hoisted from the second transport level 106 onto the third transport level 218 of the paint shop and transported into the second high-bay storage unit 110.

Only transport devices of the paint shop 100 and no process devices or treatment areas are located on the third transport level 218 of the paint shop.

Before the vehicle bodies 102 leave the second high-bay storage unit 110 on the second transport level 106 again, they can be temporarily stored in body storage bays 171 of the second high-bay storage unit 110.

A change of the treatment sequence of the vehicle bodies 102 can also be made in the second high-bay storage unit 110 in the same manner as in the first high-bay storage unit 108.

The vehicle bodies 102 are transported from the third transport level 218 onto the second transport level 106 of the paint shop 100 within the second high-bay storage unit 110 by means of the storage and retrieval units 170.

After the vehicle bodies 102 have left the second high-bay storage unit 110 on the second transport level 106, these are prepared for the top coat painting operation in the third process section 300 of the paint shop 100, e.g. by sanding, and are then provided with a primer. The primer is intermediately dried before the vehicle bodies 102 are painted with a clear coat and the entire top coat is dried.

The application of primer and clear coat can be performed by means of paint robots or manually or partly by means of paint robots and partly manually.

The vehicle bodies 102 on the second transport level 106 are then transported into the third high-bay storage unit 112.

Before the vehicle bodies 102 on the first transport level 104 are transported out of the third high-bay storage unit 112, these can be temporarily stored in body storage bays 171 of the third high-bay storage unit 112.

In this case, the treatment sequence of the vehicle bodies 102 in the third high-bay storage unit 112 can be changed in the same way as in the first high-bay storage unit 108 and in the second high-bay storage unit 110.

The vehicle bodies 102 are transported in the third high-bay storage unit 112 from the second transport level 106 onto the first transport level 104 by means of the storage and retrieval units 170 of the third high-bay storage unit 112.

After the vehicle bodies 102 have left the third high-bay storage unit 112 on the first transport level 104, the vehicle bodies 102 are finished in the fourth process section 316 of the paint shop 100 and inspected, refinished, if necessary, and then moved to a subsequent final assembly plant at the exit 308 of the paint shop 100.

Most treatment areas arranged on the first transport level 104 of the paint shop 100, in particular the seam sealing areas 188, the open work spaces of the underseal application units 190, the fine sealing areas 192, the finishing and inspection areas 304 and the finishing work preparation area 312 are open treatment areas and open work spaces, which are open towards the building interior 132 of the building shell 116 and are not separated from the building interior 132 by partition walls.

The underseal application booths 191 on the first transport level 104 of the paint shop and the treatment areas arranged on the second transport level 106 of the paint shop, in particular the pretreatment unit 138, the CDC unit 146, the CDC continuous-flow drier 152 with the cooling zone 154, the filler spray booth 202, the filler continuous-flow driers 204 with the cooling zones 206, the top coat preparation booths 272, the primer spray booths 274, the intermediate continuous-flow driers 276, the cooling zones 280, the clear coat spray booths 282, the evaporation zones 284 and the top coat continuous-flow driers 286 with the cooling zones 288 are closed treatment areas, which are separated from the building interior 132 of the building shell by booth or drier walls.

Transport of the vehicle bodies 102 through the pretreatment unit 138, the CDC unit 146 and the underseal application units 190 can be conducted by means of overhead conveyors, transport of the vehicle bodies 102 through the remaining open or closed treatment areas and between the treatment areas as well as to and from the high-bay storage units 108, 110 and 112 can be conducted by means of roller conveyors.

In the paint shop 100 described above the transport of the vehicle bodies 102 from one of the high-bay storage units 108 or 110 into the respective following high-bay storage unit 110 or 112 is always conducted via the respective process section 230 or 300 located between these; no direct transport of vehicle bodies 102 from one of the high-bay storage units into another high-bay storage unit or return transport of vehicle bodies 102 against the flow direction of the transport route 132 is provided.

The invention claimed is:

1. A paint shop for painting objects, said objects to be painted are in the form of vehicle bodies and/or driver's cabins for lorries, comprising a building shell, which encloses a building interior, in which are arranged at least one dip tank and at least one open treatment area, which is open in relation to the building interior;

a transport route along which the objects are transported on at least a first transport level and a second transport level, the first transport level lying below the second transport level;

at least one first process section comprising at least one treatment area for a surface treatment of the objects, said at least one treatment area of the at least one first process section comprising at least one dip tank for dipping the objects therein;

at least one second process section comprising at least one treatment area for a surface treatment of the objects; and at least one intermediate storage unit configured as a high-bay storage unit and configured to transfer the objects between the first and second transport levels and comprising a plurality of storage bays which are stationary and fixed in location, the intermediate storage unit further being stationary and fixed in location and configured to receive the objects along the transport route after said objects have been treated in said at least one dip tank, wherein the at least one first process section terminates at the intermediate storage unit and the at least one second process section starts at the intermediate storage unit so that the objects are transported through the second process section after the objects have been transported through the first process section;

wherein the first process section lies at least partially along the second transport level and the second process section lies at least partially along the first transport level; and wherein the objects are lowered into the at least one dip tank from the second transport level.

2. The paint shop according to claim 1, wherein the paint shop comprises at least one drier configured for transportation of the objects through the at least one drier on the second transport level.

3. The paint shop according to claim 1, wherein the paint shop comprises at least one paint spray booth configured for transportation of the objects through the at least one paint spray booth on the second transport level.

4. The paint shop according to claim 1, wherein the paint shop comprises at least one underseal application unit configured for transportation of the objects through the at least one underseal application unit on the first transport level.

5. The paint shop according to claim 1, wherein at least one separation device for the separation of paint overspray from the exhaust air of a paint spray booth and/or at least one device for disposing of paint sludge are arranged on the first transport level.

6. The paint shop according to claim 1, wherein at least one air supply unit for supplying at least one paint spray booth with inlet air is arranged on the first transport level.

7. The paint shop according to claim 1, wherein the paint shop comprises at least one exhaust air unit for discharging exhaust air out of at least one paint spray booth, wherein the exhaust air unit is arranged outside the building shell at the level of the first transport level.

8. The paint shop according to claim 1, wherein at least one heating unit for heating at least one drier is arranged on the first transport level.

9. The paint shop according to claim 1, wherein the paint shop comprises at least two intermediate storage units, which are configured for transportation of the objects from one transport level of the paint shop onto another transport level of the paint shop.

10. The paint shop according to claim 1, wherein each process device of the paint shop either is arranged on the first transport level or is arranged on a framework, which extends upwards from a floor of the building shell arranged on the first transport level.

11. The paint shop according to claim 1, wherein at least one intermediate storage unit is arranged directly adjacent to a wall of the building shell.

12. The paint shop according to claim 1, wherein all the process devices of the paint shop are arranged on the first transport level or on the second transport level of the paint shop.

13. The paint shop according to claim 1, wherein at least one storage bay is provided with a cover.

14. The paint shop according to claim 13, wherein the cover comprises a plastic material.

15. The paint shop according to claim 13, wherein the cover comprises polyethylene.

* * * * *